(12) United States Patent
Boehm

(10) Patent No.: US 8,795,839 B2
(45) Date of Patent: Aug. 5, 2014

(54) REPAIR METHOD FOR OPTICAL ELEMENTS HAVING A COATING AND CORRESPONDING OPTICAL ELEMENTS

(75) Inventor: Thure Boehm, Aalen (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 840 days.

(21) Appl. No.: 12/350,474

(22) Filed: Jan. 8, 2009

(65) Prior Publication Data

US 2009/0174934 A1  Jul. 9, 2009

Related U.S. Application Data

(60) Provisional application No. 61/019,763, filed on Jan. 8, 2008.

(30) Foreign Application Priority Data

Jan. 8, 2008 (DE) .......................... 10 2008 003 533

(51) Int. Cl.
| G02B 1/10 | (2006.01) |
| B05D 3/00 | (2006.01) |
| B05D 3/06 | (2006.01) |
| B05D 3/14 | (2006.01) |
| B05D 5/06 | (2006.01) |
| B32B 17/00 | (2006.01) |
| G02B 1/02 | (2006.01) |

(52) U.S. Cl.
USPC ........... 428/426; 428/428; 428/432; 428/433; 428/434; 428/446; 428/457; 428/469; 428/472.3; 428/696; 428/699; 428/698; 428/702; 428/408; 428/411.1; 428/336

(58) Field of Classification Search
USPC .......................... 428/428, 432, 698, 701, 702
See application file for complete search history.

(56) References Cited

U.S. PATENT DOCUMENTS

| 5,265,143 A * | 11/1993 | Early et al. ........................ 378/84 |
| 6,387,572 B1 | 5/2002 | Tong et al. |
| 2002/0063965 A1 | 5/2002 | Slashchenko |
| 2003/0043483 A1 | 3/2003 | Folta et al. |
| 2003/0081722 A1 | 5/2003 | Kandaka et al. |
| 2007/0081227 A1 * | 4/2007 | Hartig ............................ 359/359 |
| 2007/0177274 A1 | 8/2007 | Masaki et al. |

FOREIGN PATENT DOCUMENTS

JP    06-124876 A    5/1994

OTHER PUBLICATIONS

Gaines et al. "Repair of high performance multilayer coatings" SPIE vol. 1547, Multilayer Optics for Advanced X-Ray Applications (1991), pp. 228-238.

* cited by examiner

*Primary Examiner* — David Sample
(74) *Attorney, Agent, or Firm* — Edell, Shapiro & Finnan, LLC

(57) ABSTRACT

A method for repairing optical elements having a coating, in which the coating is fully or partially removed or left on the optical element, a polishing layer being provided in the coating or a polishing layer being applied, which allows simple processing of the surface to achieve high geometrical accuracy and lower surface roughness. A new coating is applied onto the corresponding polishing layer. Also addressed are corresponding optical elements, including optical elements recycled according to the method.

7 Claims, 3 Drawing Sheets

REPAIR METHOD FOR OPTICAL ELEMENTS HAVING A COATING AND CORRESPONDING OPTICAL ELEMENTS

This application claims benefit of U.S. Provisional Application No. 61/019,763, filed Jan. 8, 2008, which is incorporated into this application by reference.

FIELD AND BACKGROUND OF THE INVENTION

The present invention relates to a method for repairing optical elements having a coating, as well as to optical elements correspondingly prepared therefor and to optical elements repaired by the corresponding method.

For the production of microelectronic components or other micro- or nanostructured elements, lithography methods are used in which light, i.e. electromagnetic radiation in general, with short wavelengths is being used increasingly in order to be able to achieve a corresponding resolution. For example, EUV (extreme ultraviolet) light with wavelengths in the range of 13 nm may be used as electromagnetic radiation. The corresponding projection exposure apparatus have optics which comprise a multiplicity of mirrors. Furthermore a collector, which collects the light from the EUV light source, is provided in such a projection exposure apparatus. In particular, the collector is exposed to high thermal loads and, besides the irradiation due to the EUV light, also possible loads due to particles incident from the light source.

Since the corresponding optical elements, such as mirrors and the collector, of a projection exposure apparatus are manufactured with great cost, it is advantageous to provide opportunities for repair. Correspondingly, for example from JP 06124876 A and US 2002/0063965 A1 (both of which are hereby incorporated into the present application by reference), it is known that optical elements can be refurbished if a cleaving layer is provided between the substrate, i.e. the optical element, and a functional coating on the optical element, for example an antireflection layer or reflection layers, which allows cleaving of the functional coating. The corresponding substrate can therefore be reused by applying a new coating.

Although the cleaving layer is intended to permit simple cleaving of the coating, removal of the coating may cause damage to the surface of the optical element so that the fresh coating does not lead to the desired result and the optical element may possibly need to be rejected.

SUMMARY OF THE INVENTION

It is therefore an object of the present invention to provide for the repair of an optical element having a coating in an effective way without, as in the prior art, causing damage to the optical element after the coating is removed and making it unusable. Overall, a repair method and correspondingly adapted or repaired optical elements are intended to be provided, which allow simple and effective but also high-quality repair of optical elements having coatings.

One aspect of the invention is based on the discovery that with pure cleaving of a damaged coating, the surface quality of the underlying substrate or optical element will not normally be sufficient. Correspondingly, it is necessary to carry out surface processing. The difficulty here, however, is that the desired shape will sometimes no longer be maintained or achievable in the event of extensive surface processing of the optical element. According to this aspect of the invention, therefore, a polishing layer is provided which can be processed very well and therefore allows high geometrical accuracy and low surface roughness of the optical surface of the optical element.

The polishing layer may be configured in such a way that the polishing layer is easier to polish than the substrate material, so that high geometrical accuracy and low surface roughness can be achieved more easily, or can be achieved for the first time.

Correspondingly, substrate materials which are difficult to polish may be used, so that they can comply better with other requirements, for example in respect of mechanical stability, thermal expansion and the like. Overall, a balanced property profile can therefore be adjusted for the overall component.

According to a first aspect of the invention, the polishing layer may already be provided in the layer stack of the optical element so that the coating is merely removed as far as the corresponding polishing layer. This may for example be achieved by providing the polishing layer below a cleaving layer, so that cleaving the damaged coating above the cleaving layer exposes the polishing layer. In this context, the polishing layer therefore exerts a protective effect for the underlying optical element or substrate. After the functional coating has been removed as far as the polishing layer, the polishing layer may be processed accordingly in order to adjust the desired shape and surface roughness.

If necessary, the polishing layer may be supplemented to a required minimum thickness by coating. This may be done either before surface processing of the entire polishing layer or after surface processing of the remaining sublayer.

According to another aspect, the coating may be fully or partially removed and the polishing layer may be deposited after removing the coating, so that subsequent surface processing to achieve a required surface roughness and geometrical accuracy (fit) takes place only in the polishing layer.

In this variant, for example, the coating may be removed fully as far as the surface of the optical element or substrate. Any damage to the surface of the optical element may be compensated for by the subsequently deposited polishing layer, so that here again the corresponding geometrical accuracy and surface condition in respect of roughness and the like can be adjusted.

According to another aspect, removal of the damaged coating may be entirely obviated and the damage to the coating may be compensated for by applying a polishing layer and subsequently processing the polishing layer.

Accordingly, an optical element recycled in this way has at least one polishing layer, between at least a part of a first functional coating and at least a part of a second functional coating, which has been applied during the recycling.

Furthermore, the invention makes it possible to provide an optical element in which the cleaving layer is simultaneously designed as a polishing layer. In this case, for example when dissolving the cleaving layer by wet chemical etching, the polishing layer, which at the same time is the cleaving layer, is co-ablated when removing the functional coating. For the recycled optical element, applying the combined cleaving and polishing layer makes it possible on the one hand to adjust the geometrical accuracy and surface roughness before coating again with a functional layer, and on the other hand to cleave the functional layer suitably once more following new damage to the functional layer.

Overall, it may be seen that the provision of a polishing layer in the coating of an optical element with a view to future repair of the optical element, or provision or application of the polishing layer during the repair process, offers many possibilities and advantages for the recycling of optical elements.

The damaged coating may be removed by many different suitable methods, in particular chemically, thermally and/or mechanically. Suitable methods for this are in particular wet chemical etching, ion bombardment, sputtering, laser ablation, grinding and polishing. Through the provision of a polishing layer, for example, it is also possible to establish from the modified ablation behavior that the functional coating has now been removed and the ablation can be adjusted.

As a rapid and effective method for removing the damaged coating, in particular the coating may be cleaved by removing one or more sublayers, so-called cleaving layers, arranged on the surface of the optical element or substrate, or arranged neighboring. Such sublayers may, for example, be removed by selective etching or chemical dissolving in general.

Before a new coating is applied, the polishing layer on the optical element may be subjected to surface processing.

As an alternative, in the event that a polishing layer is already provided in the optical element and the coating is cleaved as far as this, the surface may be checked and/or analyzed before any processing so that surface processing of the polishing layer may even be obviated if the quality is sufficiently good.

The surface processing of the polishing layer may be carried out by chemical, mechanical and/or beam-enhanced surface processing, in which case methods such as ion beam figuring (IBF), laser material processing or mechanical methods such as grinding and polishing may be employed.

The coating on the one hand with the new functional layer and/or on the other hand with a polishing layer or polishing sublayer may be carried out in any way, in particular wet chemically by chemical and/or physical vapor deposition (CVD, PVD) and/or plasma-enhanced chemical vapor deposition (PECVD) and/or other suitable methods. In relation to physical vapor deposition, in particular thermal evaporation, electron beam evaporation, laser beam evaporation, arc discharge evaporation, molecular beam epitaxy, ion plating, sputtering or the like may be used.

After the corresponding functional, cleaving or polishing layers have been deposited, the layers may be compacted by heat treatment or ion bombardment.

The polishing layer may be provided with a thickness of from 50 nm to 100 μm, in particular from 100 nm to 50 μm, preferably from 0.5 μm to 5 μm, these thickness indications applying both for the state after deposition and for a corresponding state after surface material processing.

The method may be employed for all optical elements, i.e. in particular reflexive or refractive optical elements such as mirrors or optical lenses. It is, however, preferably used for reflective optical elements such as mirrors or collectors in EUV projection exposure apparatus.

Crystalline material, calcium fluoride, barium fluoride, silicon fluoride, sodium fluoride, potassium fluoride, silicon, in particular crystalline silicon, ULE materials with extremely low thermal expansion, for example zerodur, aluminum, copper, diamond, diamond-like carbon, silicon carbide or compounds or alloys thereof, may be used as a substrate material for the optical elements.

Amorphous material or ductile material may preferably be used for the polishing layer. In particular, metals may also be envisaged for the polishing layer.

If the polishing layer is also to be used as a cleaving layer, then a material may be selected which can be removed selectively with respect to the adjoining materials, i.e. attacked by corresponding agents which do not attack the overlying functional layer or in particular the underlying material of the optical element.

Quartz glass, silicon dioxide, magnesium fluoride, diamond-like carbon, aluminum oxide, silver, chromium, titanium, nickel, nickel phosphide and compounds and alloys thereof, may be used for the polishing layer.

BRIEF DESCRIPTION OF THE FIGURES

Other advantages, characteristics and features of the present invention will become clear from the following detailed description of exemplary embodiments with the aid of the appended drawings. The following are shown purely schematically in the drawings.

DETAILED DESCRIPTION OF PARTICULAR EMBODIMENTS

Figure 1:
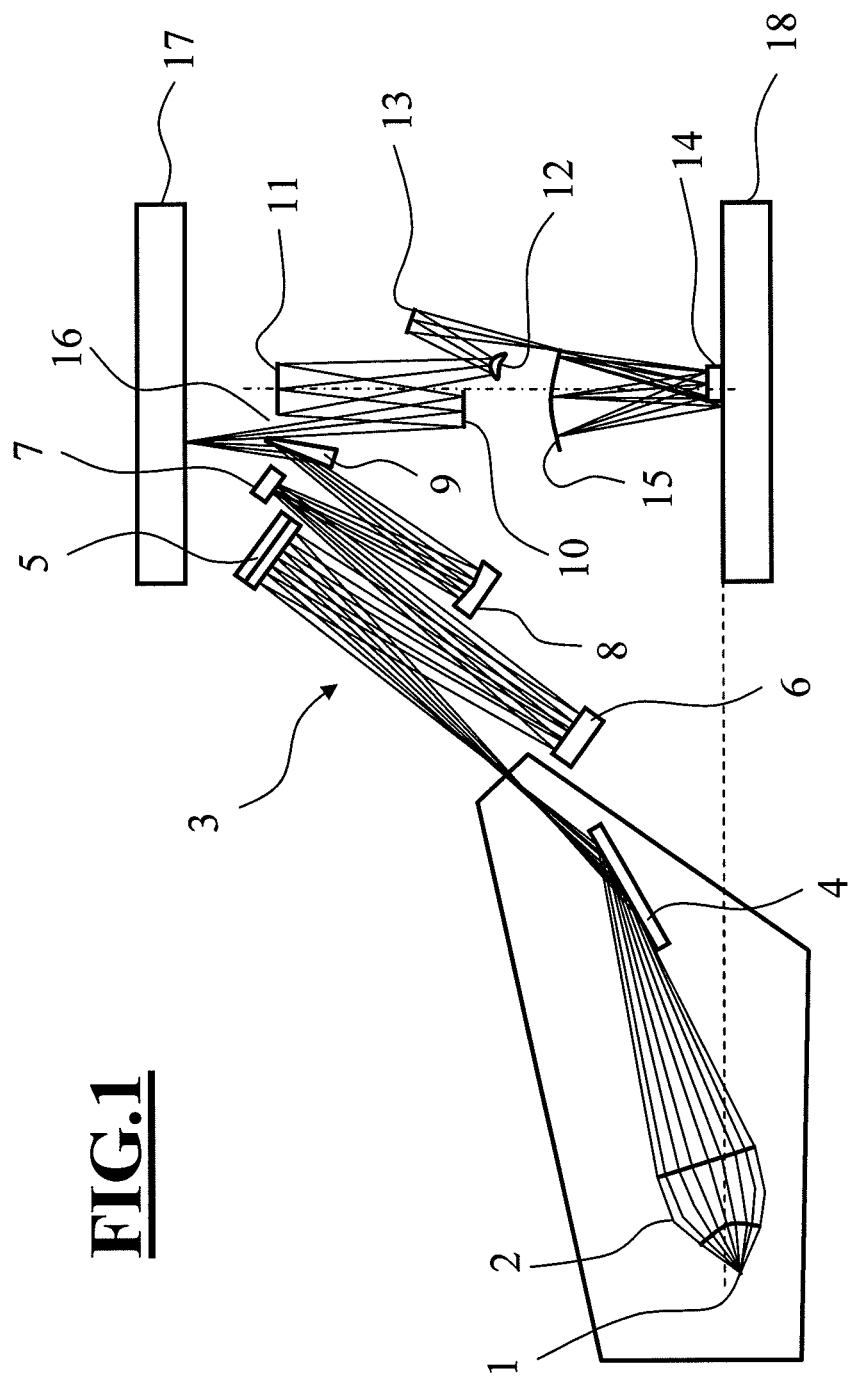
FIG. 1 shows a representation of an EUV projection exposure apparatus in which the present invention may be employed.

FIG. 1 shows an EUV projection exposure apparatus in a purely schematic representation, as is described for example in WO 2003/014833 A. Such a projection exposure apparatus has an EUV light source 1 and a collector 2 for collecting and forwarding the EUV light. The illumination system 3 comprises a plurality of mirrors 4 to 9 that deflect light rays 16 onto the reticle 17, which has a structure to be imaged onto the wafer 18. The imaging is carried out using projection optics, which in turn have a plurality of mirrors 10 to 15. Although the present invention may be used to repair optical elements having a coating on optical elements in general, i.e. also on refractive optical elements such as lenses, use for reflective optical elements such as mirrors 4 to 15 or collectors 2, which are employed in EUV lithography, is advantageous. The mirrors 4 to 15, like the collector 2, have reflection coatings which may be constructed from a multiplicity of thin layers in order to form a Bragg reflector.

In particular the collector 2, which is arranged in the immediate vicinity of the EUV light source 1, is exposed to high thermal loading and, besides the radiation dose, also possible bombardment by particles from the light source, so that the reflection coating can suffer damage.

After damage to the reflection coating, the collector 2 must be replaced if it no longer has the requisite properties, which entails high cost since the collector 2 itself is very expensive to produce. This is because for the mirrors 4 to 15, and in particular for the collector 2, there are stringent requirements for geometrical accuracy and cleanliness of the surfaces in EUV lithography. Correspondingly, it is advantageous for the collector 2 or the mirrors 4 to 15 to be repairable in the event of damage.

Figure 2:
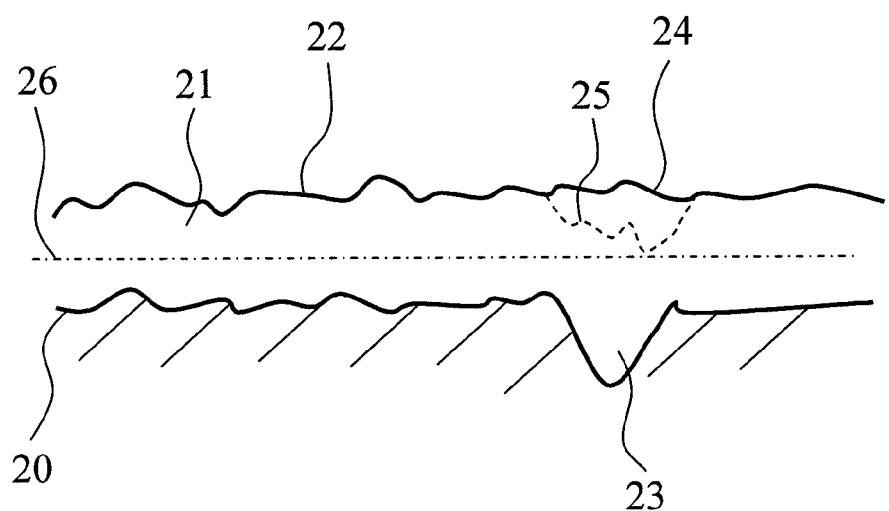
FIG. 2 shows a schematic representation of a surface region to illustrate the functionality of a polishing layer.

To this end, as described above, a polishing layer is provided which makes it readily possible to produce a surface with high geometrical accuracy and low roughness by surface processing. The functionality is represented schematically in FIG. 2 with the aid of a cross section through a surface region.

The surface 20 delimits either the optical element after removal of the coating, or the surface of a coating which is left on the optical element.

The surface 20 has a defect in the form of an indentation 23, which has resulted for example from the removal of a damaged coating or exists as damage in a functional layer.

According to this aspect of the invention, a polishing layer 21, which can be processed easily by surface processing, is applied onto the corresponding surface 20. The indentation 23 is filled when the polishing layer 21 is deposited, either with the contour of the surface 20 being replicated on the surface 22 of the polishing layer (surface region 25) or with a continuous, substantially plane surface 22 being formed (surface region 24). Moreover, the surface layer 22 has a certain roughness overall, which is defined by the coating process.

Since the polishing layer 21 can be processed easily by surface processing, a part of the polishing layer 21 is ablated by suitable methods as far as the new surface 26, with adaptation to the desired shape of the surface and smoothing of the surface 26 simultaneously taking place. Correspondingly, compensation also occurs in the case of the indented surface region 25.

A new functional layer can be deposited onto the surface 26 processed in this way, and the corresponding optical element can be returned to its intended purpose in repaired or recycled form.

Figure 3:
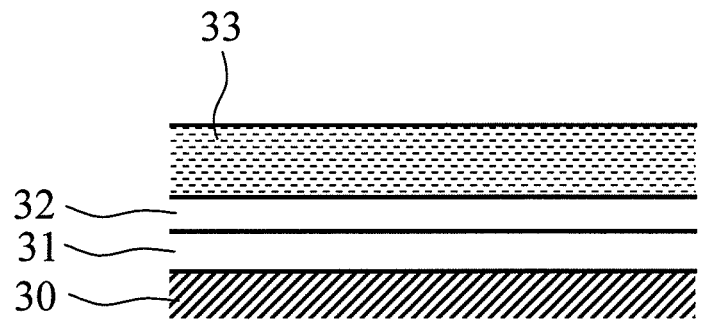
FIG. 3 shows a cross section through a first layer structure.
Figure 4:
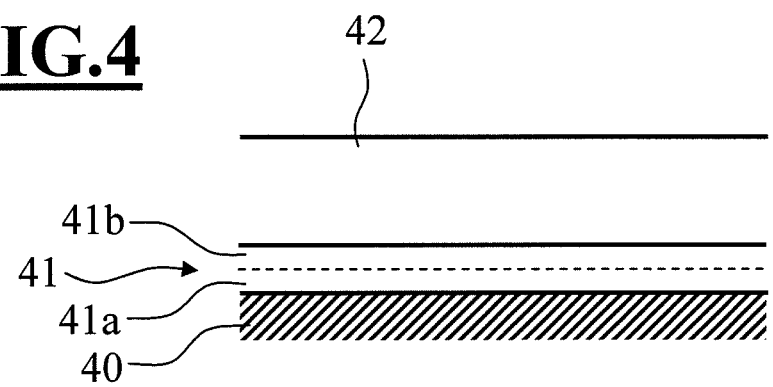
FIG. 4 shows a cross section through a second layer structure.
Figure 5:
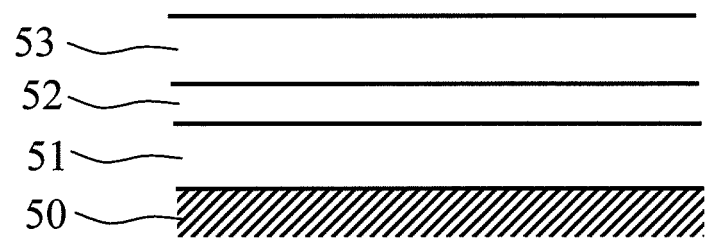
FIG. 5 shows a cross section through a third layer structure.

FIGS. 3 to 5 show optical elements which are formed according to the repair method or are adapted for use of the repair method.

FIG. 3 represents a part of an optical element 30, for example an EUV collector, on the surface of which a polishing layer 31, a cleaving layer 32 and a functional layer 33, for example in the form of a reflection layer made of a multiplicity of interacting sublayers (see dashed lines), are formed. Such an optical element is prepared and adapted for the repair method according to the invention. Specifically, as soon as the functional layer 33 exhibits damage which necessitates repair, the functional layer can be removed with the aid of the cleaving layer 32. This may, for example, be done by selective wet chemical etching of the cleaving layer 32. During repair, the optical element 30 then remains with the polishing layer 31, which may sometimes be damaged by the cleaving method. In this sense, the polishing layer 31 in the configuration according to FIG. 3 also functions as a protective layer for the optical element 30. Since the polishing layer 31 can be processed easily by surface processing, possible damage due to removal of the functional layer 33 and the cleaving layer 32 can readily be compensated for by corresponding surface processing. Subsequently, a new functional layer 33 can then be applied onto the polishing layer 31 prepared in this way, with or without fresh deposition of a cleaving layer 32. The polishing layer 31 may also be filled up to the original thickness if necessary, in which case the filling process may take place either after the surface processing of the polishing layer or even before the surface processing.

With a corresponding optical element which is already adapted and prepared for the subsequent repair or recycling, the expensively produced optical element 30 can rapidly and effectively be recycled and adapted for renewed use.

FIG. 4 shows an optical element 40, which has a functional layer 42 and a combined cleaving and polishing layer 41. With such an optical element, the combined cleaving and polishing layer 41 may be partially removed when removing the functional layer 42, so that only the sublayer 41a remains on the optical element 40.

After cleaving the functional layer 42 and the sublayer 41b, the cleaving and polishing layer 41 may be refilled by corresponding deposition of a new sublayer 41b, in which case the polishing layer 41 may be filled either after surface processing of the sublayer 41a or before surface processing of the fully deposited polishing layer 41. A new functional layer 42 can then be applied onto the correspondingly deposited polishing layer 41, and the optical element 40 can be reused.

Instead of partially cleaving the combined cleaving and polishing layer, it is also possible to provide full cleaving of the cleaving and polishing layer 41, in which case a combined cleaving and polishing layer is again applied for the next working cycle of the optical element in order to ensure, on the one hand, that the functional layer 42 to be freshly deposited can be deposited on a defined surface of the polishing layer and, on the other hand, that the functional layer 42 can again be cleaved by means of the combined cleaving and polishing layer 41 after new damage to it.

FIG. 5 shows a layer sequence of a recycled optical element 50, in which the functional layer 51 has at least not entirely been removed, but instead a polishing layer 52 has been deposited onto the functional layer 51 in order to allow easy adjustment of the desired shape and roughness in the polishing layer. Subsequently, a new functional coating 53 has been applied onto the polishing layer 52.

Although the present invention has been described in detail with the aid of the exemplary embodiments presented, it is readily apparent to the person skilled in the art that the invention is not restricted to the exemplary embodiments, but rather that modifications or enhancements are possible in the scope of the appended patent claims such that individual proposed features of the invention may be omitted and/or individual proposed features may be combined with one another in a different way. In particular, a combination of all the proposed individual features is also covered by the invention.

The invention claimed is:
1. Optical element having a substrate and a coating, the coating comprising a functional coating and a cleaving layer, wherein
   the cleaving layer is a polishing layer processed more geometrically accurately and with lower surface roughness than the substrate.
2. Optical element according to claim 1, wherein
   the optical element is a recycled optical element and the polishing layer comprises a surface-processed layer.
3. Optical element according to claim 1, wherein
   the polishing layer comprises a first sublayer which remains after partial cleaving, and a second sublayer which is deposited onto the unprocessed or surface-processed first sublayer.
4. Optical element according to claim 1, wherein
   the optical element is a mirror or a collector for extreme-ultraviolet light lithography.
5. Optical element according to claim 1, wherein
   the cleaving layer covers the substrate and the functional coating covers the cleaving layer, forming a layer stack.
6. Optical element according to claim 1, wherein the optical element is configured as a mirror in a projection exposure apparatus for extreme ultraviolet light.
7. Optical element according to claim 6, wherein the mirror is a collector.

* * * * *